US011307800B2

(12) United States Patent
Vajravel et al.

(10) Patent No.: US 11,307,800 B2
(45) Date of Patent: Apr. 19, 2022

(54) SUPPORTING FILE EXCLUSIONS AND COMMITS IN DISK-BASED WRITE FILTERS

(71) Applicant: Dell Products L.P., Round Rock, TX (US)

(72) Inventors: Gokul Thiruchengode Vajravel, Bangalore (IN); Jyothi Bandakka, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 339 days.

(21) Appl. No.: 16/678,555

(22) Filed: Nov. 8, 2019

(65) Prior Publication Data

US 2021/0141560 A1 May 13, 2021

(51) Int. Cl.
*G06F 3/06* (2006.01)
*G06F 13/10* (2006.01)
*G06F 16/17* (2019.01)

(52) U.S. Cl.
CPC .......... *G06F 3/0659* (2013.01); *G06F 3/0604* (2013.01); *G06F 3/0619* (2013.01); *G06F 3/0643* (2013.01); *G06F 3/0644* (2013.01); *G06F 3/0647* (2013.01); *G06F 3/0674* (2013.01); *G06F 13/102* (2013.01); *G06F 16/1734* (2019.01)

(58) Field of Classification Search
CPC .... G06F 3/0604; G06F 3/0673; G06F 3/0659; G06F 3/0619; G06F 3/0643; G06F 3/067; G06F 3/0622; G06F 13/102; G06F 16/17; G06F 16/1865; G06F 3/064; G06F 3/0647
See application file for complete search history.

(56) References Cited

U.S. PATENT DOCUMENTS

| 2004/0078357 | A1* | 4/2004 | LaChapelle | G11B 27/034 |
| 2004/0111250 | A1* | 6/2004 | Hensley | G06F 3/0677 |
| | | | | 703/25 |
| 2004/0236945 | A1* | 11/2004 | Risan | H04L 69/329 |
| | | | | 713/165 |
| 2007/0101079 | A1* | 5/2007 | Macintyre | G06F 12/1416 |
| | | | | 711/E12.098 |
| 2007/0186070 | A1* | 8/2007 | Federa | G06F 12/1425 |
| | | | | 711/163 |
| 2012/0254982 | A1* | 10/2012 | Sallam | G06F 21/564 |
| | | | | 726/16 |

(Continued)

*Primary Examiner* — Tuan C Dao
(74) *Attorney, Agent, or Firm* — Kirton McConkie; Brian Tucker

(57) ABSTRACT

A disk-based write filter can include a filter driver that is loaded below the file system driver to thereby provide write filter functionality at the disk level, and a supporting driver that is loaded above the file system driver. When an excluded file is opened, the supporting driver can obtain the file's disk sector information and provide it to the filter driver to cause the filter driver to pass through I/O requests that target sectors defined in the file's disk sector information. When the excluded file is closed, the supporting driver can again obtain the file's disk sector information and provide it to the filter driver to allow the filter driver to identify any additional sectors that may have been allocated to the file. The filter driver can copy any such sectors from an overlay to disk and commence passing through I/O requests that target these sectors.

20 Claims, 15 Drawing Sheets

(56) References Cited

U.S. PATENT DOCUMENTS

| | | | | |
|---|---|---|---|---|
| 2012/0311263 A1* | 12/2012 | Kamath | ................ | G06F 3/0622 |
| | | | | 711/118 |
| 2017/0024152 A1* | 1/2017 | Bhagi | ................. | G06F 11/1448 |
| 2018/0217940 A1* | 8/2018 | Joshi | ....................... | G06F 21/78 |
| 2018/0225058 A1* | 8/2018 | Kaushik | ................ | G06F 3/0617 |

* cited by examiner

SUPPORTING FILE EXCLUSIONS AND COMMITS IN DISK-BASED WRITE FILTERS

CROSS-REFERENCE TO RELATED APPLICATIONS

N/A

BACKGROUND

Operating systems, such as Windows, provide functionality for preventing the content of a storage medium from being changed. In a typical example, it may be desirable to prevent the operating system image, which may be stored on a particular disk partition or on flash media, from being changed at runtime. For example, Windows 10 provides the Unified Write Filter (UWF) which can be used to redirect all writes that target the operating system image to a RAM or disk cache called an overlay. This overlay stores changes made to the operating system at runtime but is removed when the device is restarted thereby restoring the device to its original state.

FIG. 1A illustrates how a write filter 110 can be employed to prevent the contents of a protected volume on disk 100 from being modified. Disk 100 is intended to generally represent any type of physical storage medium (or volume). In accordance with the Windows architecture, a driver stack consisting of file system driver 111, volume manager 112, and disk driver 113 sit atop disk 100, and I/O manager 120 manages the flow of I/O requests through the driver stack. An application (not shown) can employ file/directory management APIs 160 to invoke a service of system services 130 (e.g., by calling ReadFile, WriteFile, CreateFile, etc. on a particular file) which will result in I/O manager 120 creating an IRP for the request. This IRP will then be passed down through the driver stack.

As depicted in FIG. 1, write filter 110 is positioned at the top of the driver stack and will therefore be able to process an IRP prior to the IRP being passed down to the lower level drivers. Write filter 110 can be configured to detect writes targeting a protected volume and redirect them to overlay 140 rather than allowing them to be passed down the driver stack unchanged. As a result, the write will actually occur in overlay 140 rather than to disk 100. Write filter 110 can be further configured to detect reads that target content that was previously redirected to overlay 140 and redirect these reads to overlay 140. In this way, even though it will appear to the application that the content of disk 100 is being updated, the updates are actually being temporarily maintained in overlay 140. The contents of overlay 140 can be maintained until the operating system is restarted or until an explicit command is received to discard the contents of the overlay.

In FIG. 1A, write filter 110 is shown as a file-system filter driver. However, in Windows implementations, the write filter will also include a registry filter driver so that the write filter can also prevent the content of the registry from being modified. The registry filter driver would interface with the Windows Kernel-Mode Configuration Manager in a similar manner as the file-system filter driver of write filter 110 interfaces with I/O manager 120 to handle registry operations before they are passed down to lower-level drivers. Accordingly, for purposes of this description, write filter 110 can be viewed as including a registry filter driver.

Write filter 110 is an example of a file-based write filter—i.e., a write filter that operates at the file level. As a file-based write filter, write filter 110 enables the write protection to be bypassed for particular files and directories. For example, write filter 110 allows an administrator to identify excluded files or directories for which modifications will be directly persisted to the protected volume on disk 100 as opposed to being temporarily maintained in overlay 140. Similarly, write filter 110 also allows modifications that were made to non-excluded files or directories (i.e., those that exist in overlay 140) to be committed to disk 100. This ability to exclude files/directories and/or commit changes to files/directories without disabling the write filter is an important management feature.

File-based write filters are difficult to implement because they are file-system-specific and therefore must support all of the file system's features in order to be compatible with all applications. For example, Windows 10 may employ a file system that provides advanced features such as alternate data streams, opportunistic locks, byte-range locks, online deduplication, etc. However, the UWF does not currently support many of these advanced features. If a computing device is intended to run applications that utilize advanced file system features that are not supported by the UWF (e.g., applications in the Microsoft Office Suite), it will not be possible to use the UWF as the write filter on the computing device.

From a practical perspective, this has created one significant problem—the UWF is only available for use on thin client devices because they run a simplified version of Windows. Yet, it is becoming more common for a company to employ PCs as if they were thin clients (e.g., to simplify the management of a large number of computing devices without having to replace existing PCs with thin clients). In such cases, even though the PCs are converted to function like thin clients, it is likely that the company will not be able to employ the UWF as the write filter on these PCs because the PCs will be running the full Windows operating system (e.g., Windows 10 Pro or Education) that does not support the UWF.

To address the difficulty of implementing a file-based write filter (or the lack of availability), an administrator may employ a disk-based (or sector-based) write filter. Generally speaking, disk-based and file-based write filters perform the same function—preventing the content of a protected volume from being modified. However, as represented in FIG. 1B, a disk-based write filter, write filter 110a, is loaded below file system driver 111 and therefore operates at the sector level rather than the file level. As a result, write filter 110a will be agnostic to the file system (i.e., it will work even if the file system provides advanced features) making it easier to develop and manage. Unlike a file-based write filter, however, a disk-based write filter cannot implement file level exclusions or commits because the file concept does not exist below the file system level. A disk-based write filter can provide sector exclusions (e.g., where writes that target excluded sectors are not redirected to overlay 140), but sector exclusions are not a suitable way to provide file exclusion and commit functionality.

BRIEF SUMMARY

The present invention extends to methods, systems and computer program products for supporting file exclusions and commits in disk-based write filters. A disk-based write filter can be provided to prevent the content of a protected volume from being modified. The disk-based write filter can include a filter driver that is loaded below the file system driver to thereby provide write filter functionality at the disk level, and a supporting driver that is loaded above the file system driver.

To support file exclusions, when an excluded file is opened, the supporting driver can obtain the file's disk sector information and provide it to the filter driver to cause the filter driver to pass through I/O requests that target sectors defined in the file's disk sector information. When the excluded file is closed, the supporting driver can again obtain the file's disk sector information and provide it to the filter driver to allow the filter driver to identify any additional sectors that may have been allocated to the file. The filter driver can copy any such sectors from an overlay to disk and commence passing through I/O requests that target these sectors. The supporting driver may utilize file context of file objects to identify excluded files that are being closed.

To support file commits, the supporting driver can be configured to receive commit requests from a management application and, in response, set file context of a file object for a file to be committed to indicate that the file is excluded. Then, when the file is closed, the supporting driver can obtain the file's disk sector information and provide it to the filter driver. The filter driver can copy any sectors identified in the file's disk sector information from the overlay to disk and commence passing-through I/O requests that target these sectors.

The filter driver can also be configured to detect trim commands that are directed to a solid-state drive. When a trim command is detected, the filter driver can determine whether any sector identified in the trim command is cached in the overlay and discard it. In this way, the filter driver can remove obsolete content of files from the overlay that would otherwise remain in the overlay indefinitely.

In one embodiment, the present invention is implemented by a file-based write filter as a method for supporting file exclusions. A supporting driver of the disk-based write filter receives an I/O request for opening a file and determines that the file should be excluded from the write filter protection. In response to the determination, the supporting driver retrieves disk sector information for the file and sends the disk sector information to a filter driver of the disk-based write filter. The filter driver then employs the disk sector information to exclude the file from the write filter protection.

In another embodiment, the present invention is implemented as computer storage media storing computer executable instructions which when executed on a client device implement a disk-based write filter that provides write filter protection to a volume while also supporting file exclusions. A supporting driver of the disk-based write filter, which is loaded above a file system driver for the volume, receives an I/O request for opening a file and determines that the file should be excluded from the write filter protection. In response to the determination, the supporting driver retrieves disk sector information for the file and sends the disk sector information to a filter driver of the disk-based write filter that is loaded below the file system driver. The filter driver then employs the disk sector information to exclude the file from the write filter protection.

In another embodiment, the present invention is implemented by a disk-based write filter as a method for supporting file exclusions. A supporting driver of the disk-based write filter receives an IRP_MJ_CREATE request for a file. As part of handling the IRP_MJ_CREATE request for the file, the supporting driver: determines that the file should be excluded from the write filter protection; retrieves disk sector information for the file; sends the disk sector information to a filter driver of the disk-based write filter to cause the filter driver to employ the disk sector information to exclude the file from the write filter protection; and sets a context of the file to indicate that the file is excluded.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "client device" should be construed as any user computing device that is capable of executing a write filter. A client device would therefore include desktops, laptops, tablets, thin clients, smart phones, etc. The term "disk" should encompass any type of storage device on which a volume/file system may exist. The term "disk sector information" should be construed as information that describes one or more locations on a disk. As an example, in Windows implementations, the disk sector information could be in the form of one or more logical cluster numbers and/or virtual cluster numbers that represent physical sectors on a disk.

Figure 1A:
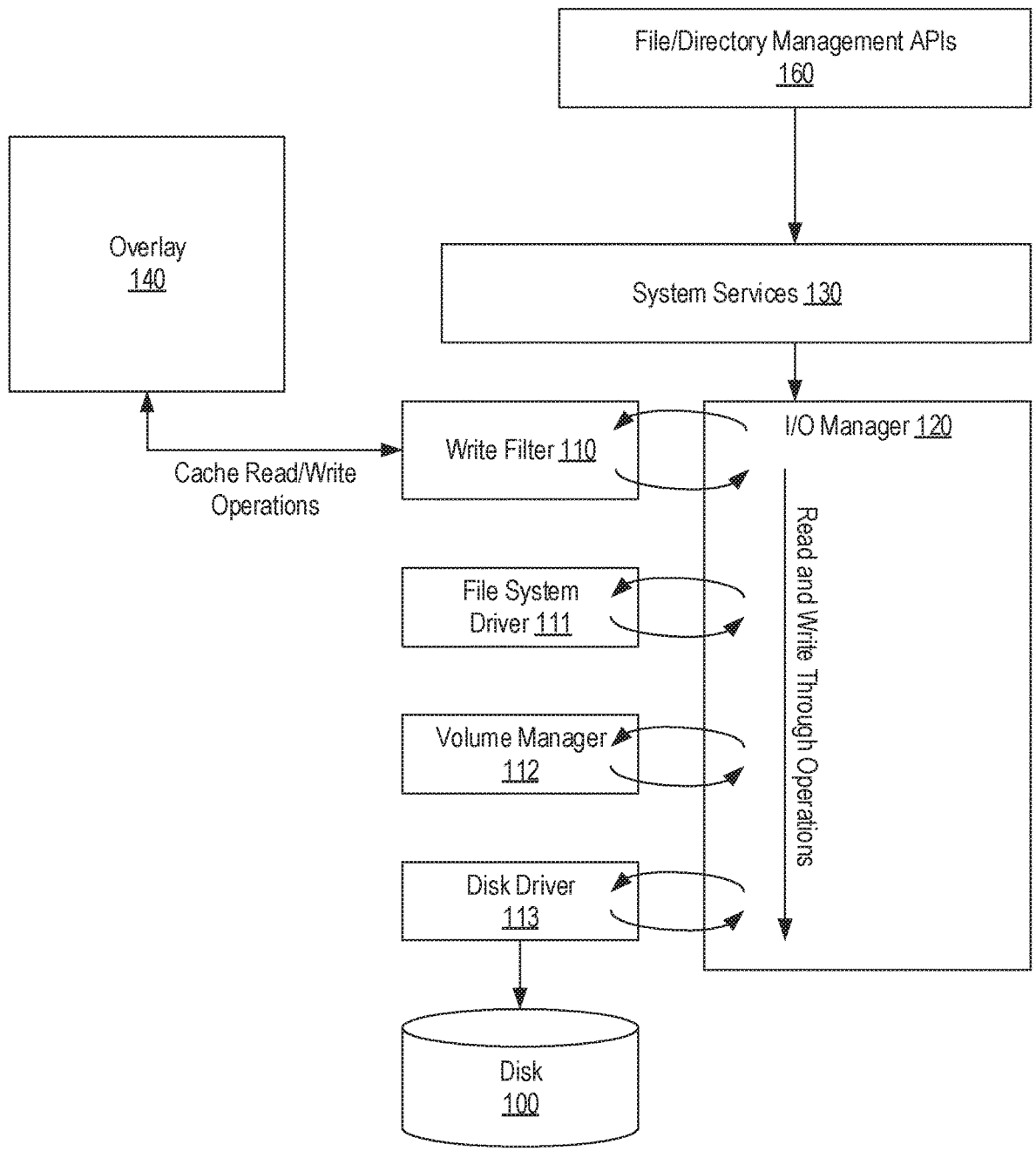
FIG. 1A illustrates a Windows-based I/O system architecture in which a file-based write filter is employed to prevent the content of a protected volume from being modified.
Figure 1B:
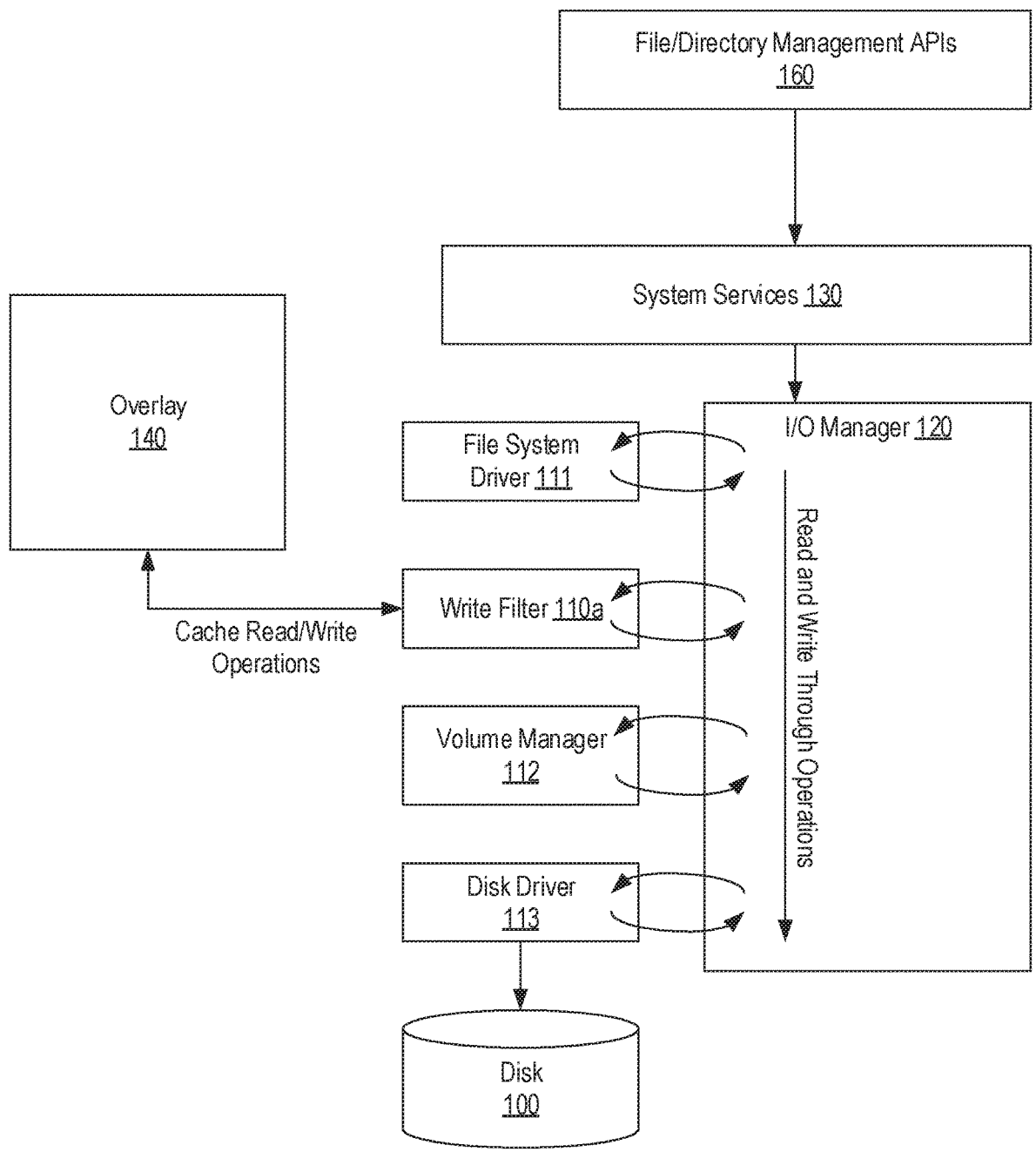
FIG. 1B illustrates a Windows-based I/O system architecture in which a disk-based write filter is employed to prevent the content of a protected volume from being modified.
Figure 2:
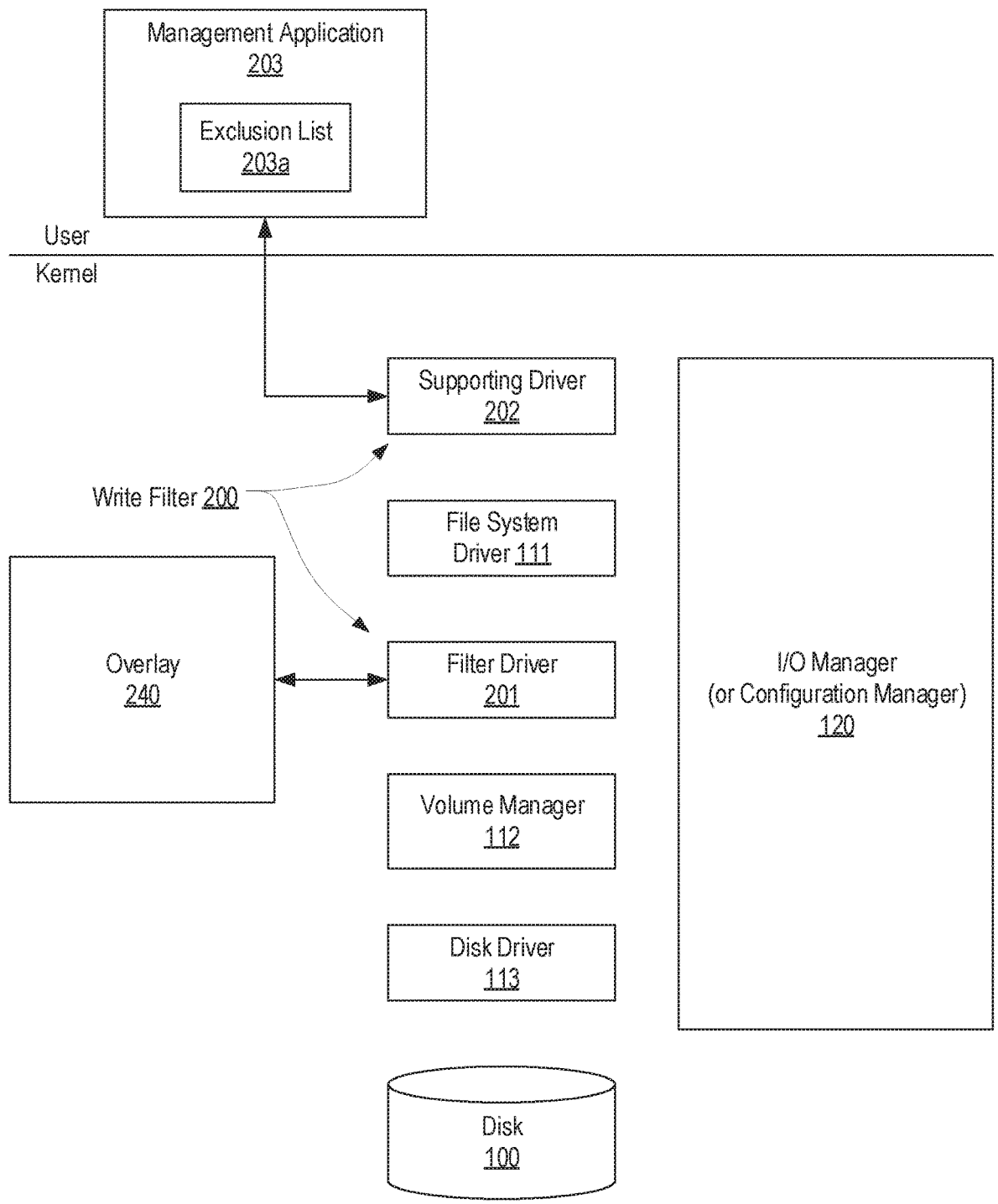
FIG. 2 illustrates a Windows-based I/O system architecture in which a write filter that is configured in accordance with embodiments of the present invention is employed to prevent the content of a protected volume from being modified.

FIG. 2 illustrates how a write filter 200 that is configured in accordance with embodiments of the present invention can be employed to provide write filter protection to a volume at the disk (or sector) level while also supporting file exclusion and commit functionality. FIG. 2 is based on the Windows I/O system architecture shown in FIGS. 1A and 1B to represent that write filter 200 can be employed on client devices running a version of the Windows operating system (e.g., write filter 200 could be employed in place of the UWF). However, a write filter configured in accordance with embodiments of the present invention could equally be designed for use on client devices running other operating systems.

Write filter 200 includes a disk-based filter driver (or simply "filter driver") 201 that is loaded in the I/O stack below file system driver 111 and a supporting driver 202 that is loaded above file system driver 111. Because filter driver 201 is loaded below file system driver 111, it can operate at the disk level rather than the file level. Filter driver 201 can employ an overlay 240 to provide write protection to a volume on disk 100 in a similar manner as existing disk-based write filters provide such protection. Overlay 240 can be implemented in any suitable manner including as a disk-based overlay on a separate volume on disk 100 or another disk or as a RAM-based overlay. Unlike existing disk-based write filters, however, write filter 200 can provide file exclusion and commit functionality.

To enable filter driver 201 to support file exclusion and commit functionality, write filter 200 also includes supporting driver 202. Although FIG. 2 depicts supporting driver 202 in the form of a minifilter that is positioned above file system driver 111, supporting driver 202 may also represent a registry filter that is registered to receive registry operations. Accordingly, in some embodiments, write filter 200 can be configured to provide exclusion and commit functionality for registry keys. The following description of how write filter 200 supports file exclusion and commit functionality should be understood as encompassing support for registry key exclusion and commit functionality. Therefore, the term "file" may be construed as encompassing registry entries in some contexts.

FIG. 2 also shows a management application 203 that maintains an exclusion list 203a. Management application 203 can represent any application, service, program, etc. that can be executed on a client device to allow an administrator or other user to add exclusions to exclusion list 203a and/or to commit a file whose content may have been cached in overlay 240. In typical implementations, these exclusions would include files, directories and registry keys. In some embodiments, management application 203 may be an agent that allows an administrator to modify exclusion list 203a from a management server or other remote device. Supporting driver 202 can be configured to interface with management application 203 in any suitable way to retrieve exclusion list 203a. For example, management application 203 could send exclusion list 203a to supporting driver 202 when supporting driver 202 is first loaded during system startup.

Figure 3A:
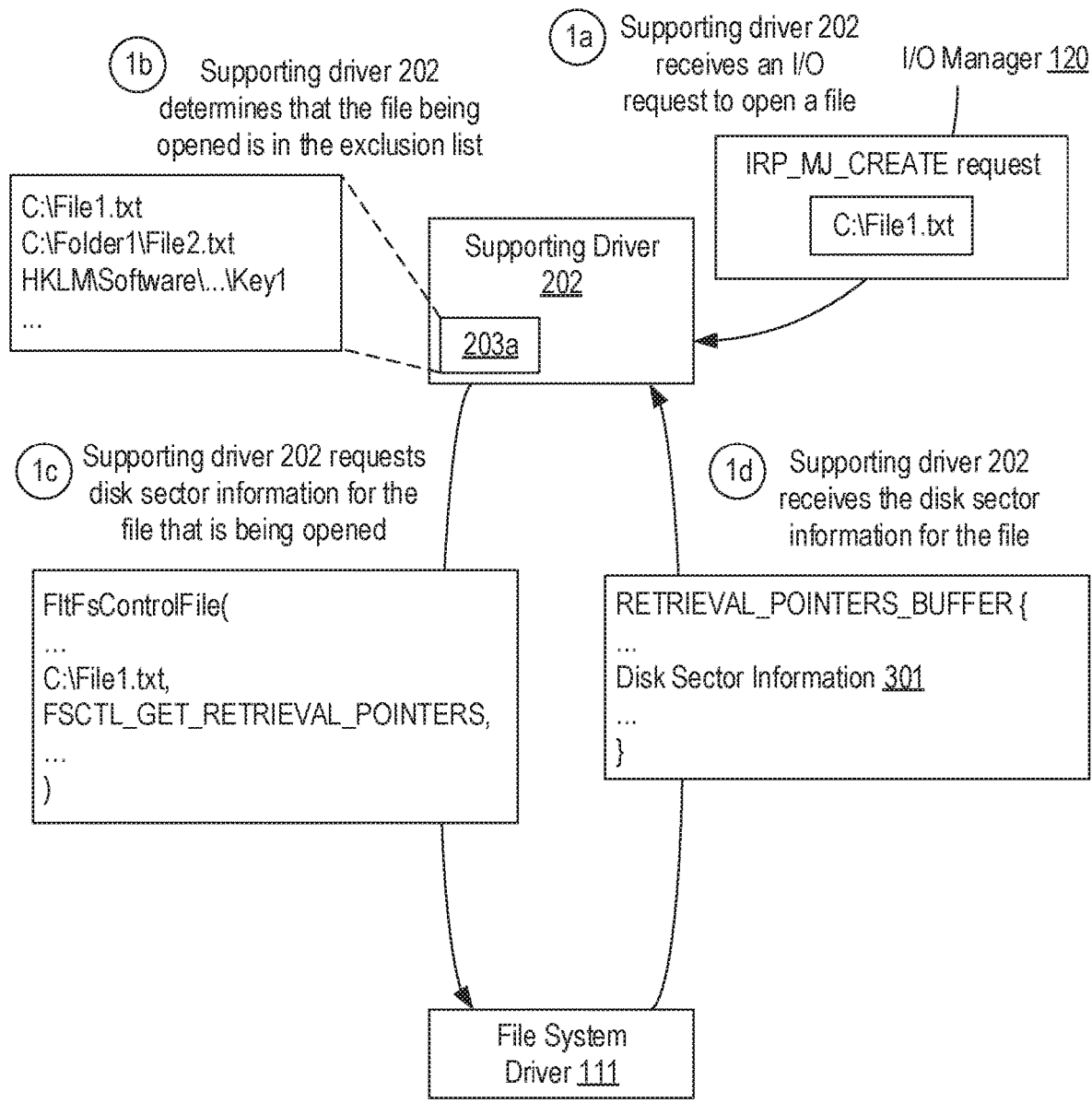
FIGS. 3A-3F and 4 illustrate how the write filter of the present invention can enable file exclusion and commit functionality.
Figure 3B:
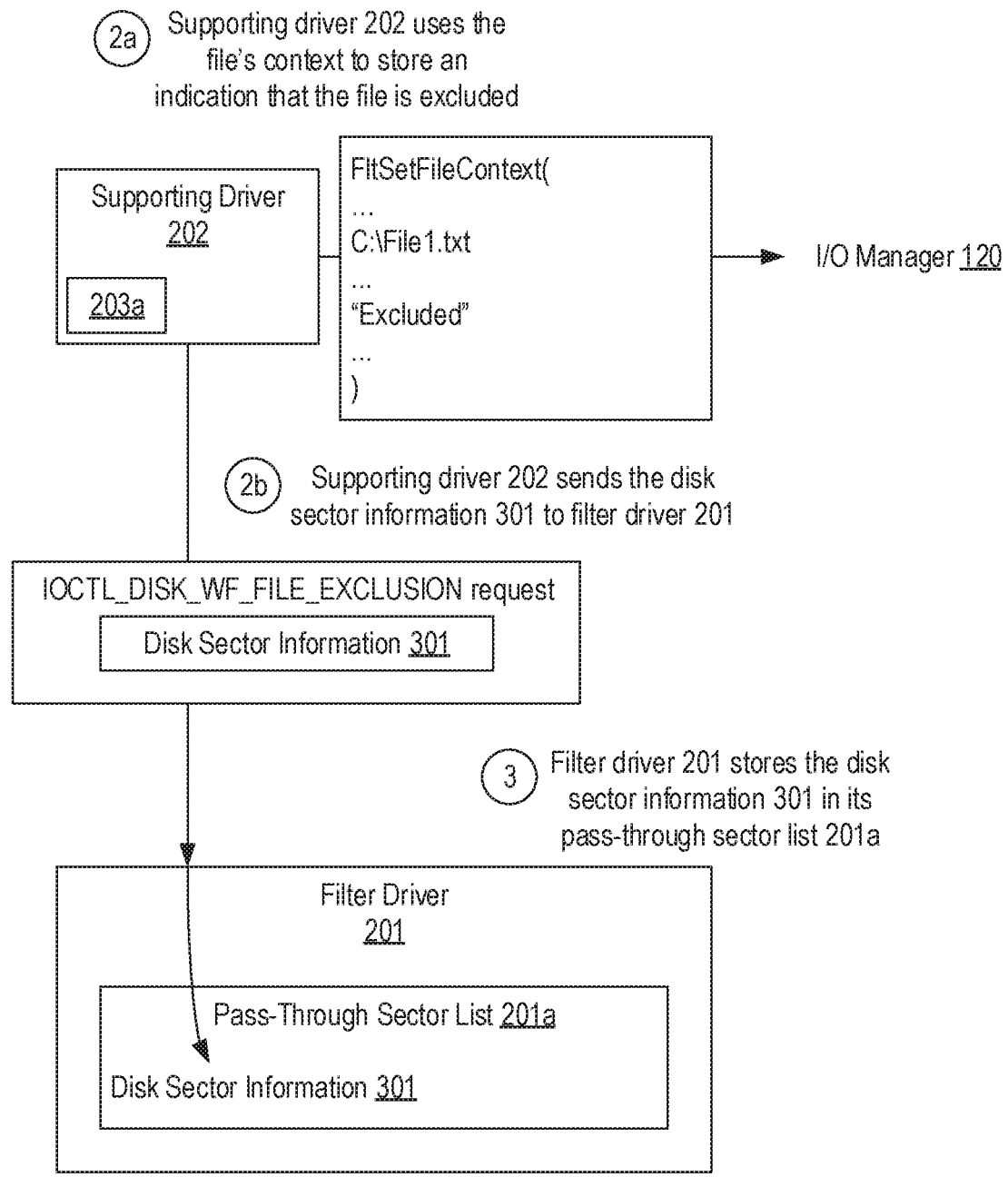
Figure 3C:
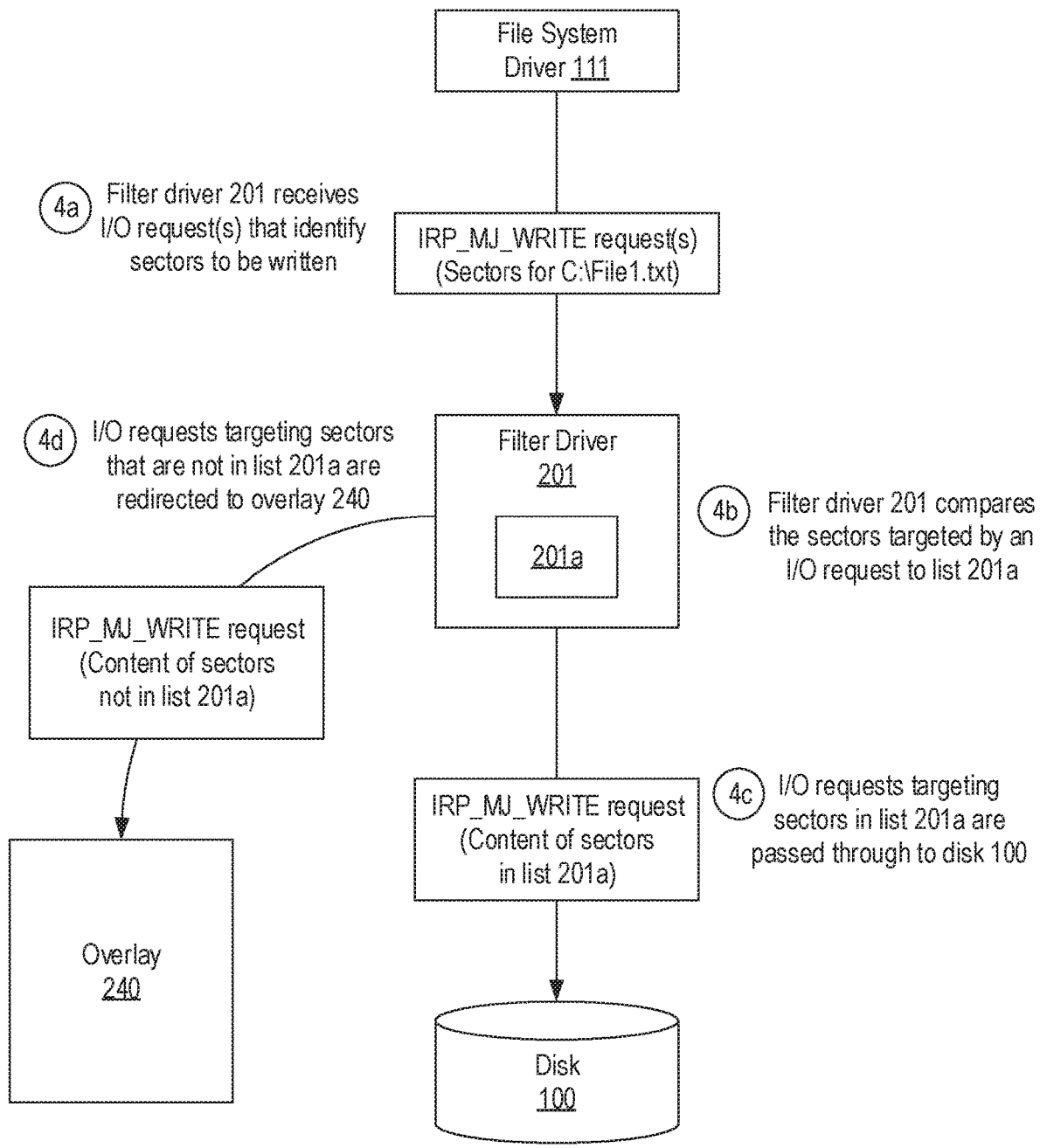
Figure 3D:
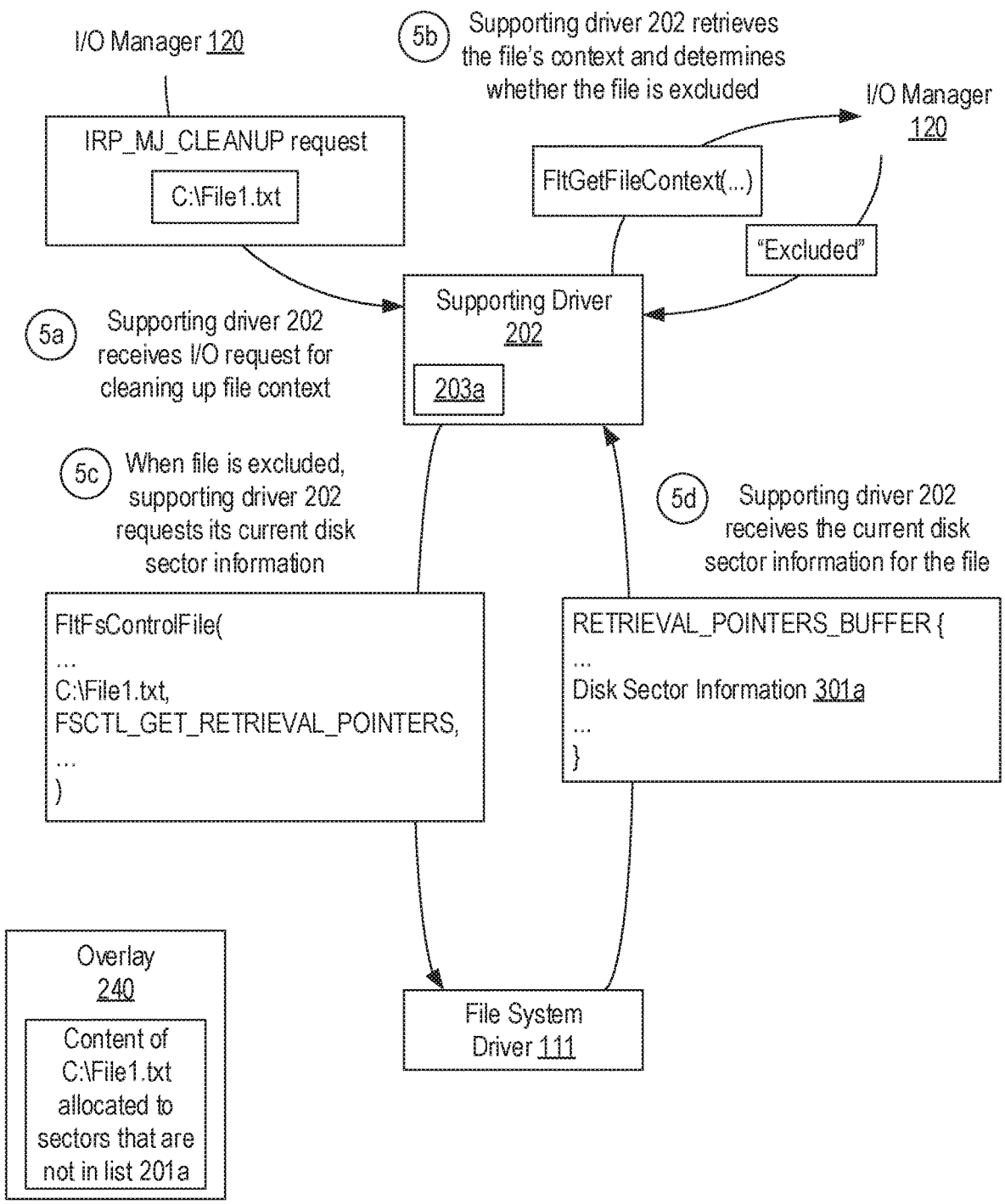
Figure 3E:
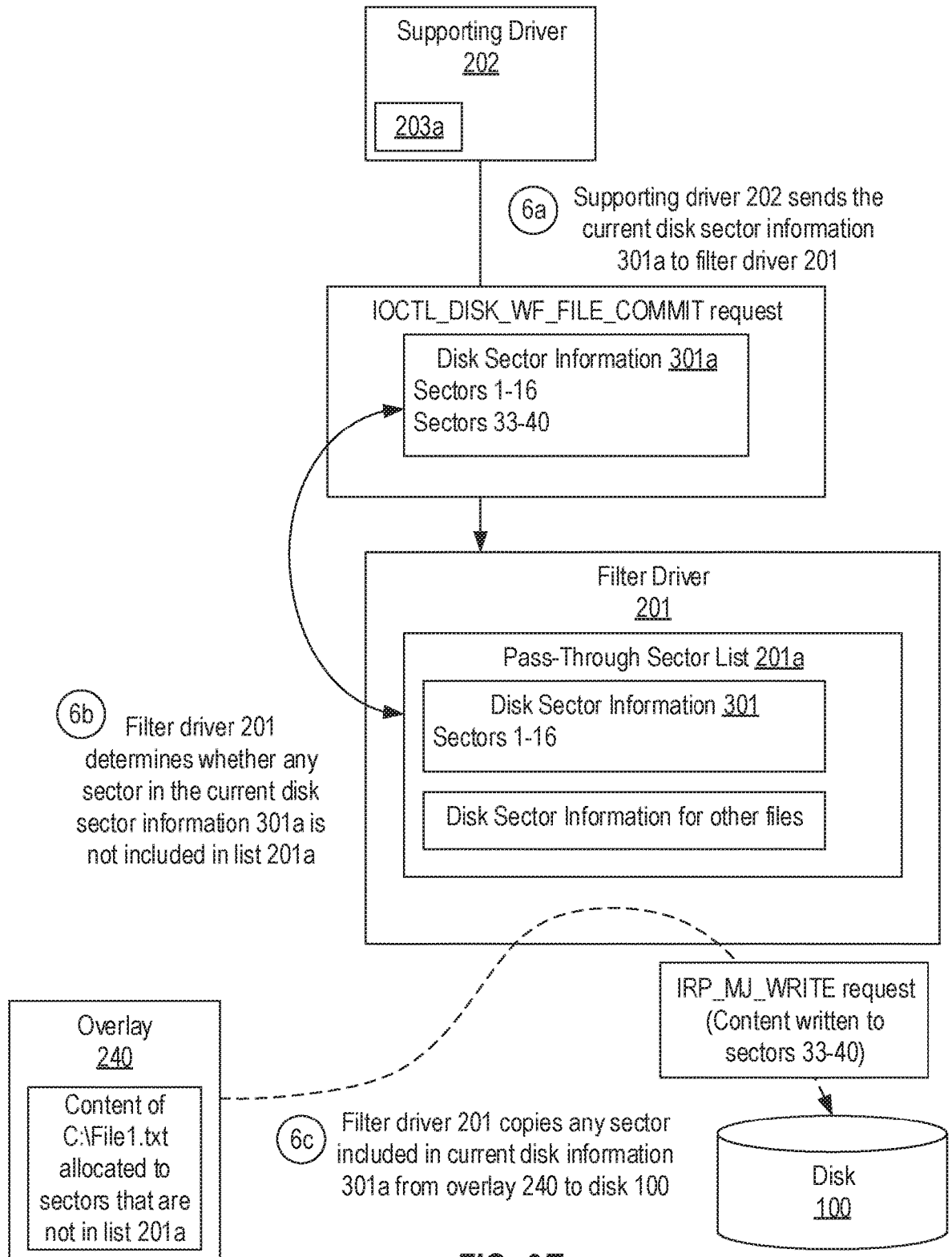
Figure 3F:
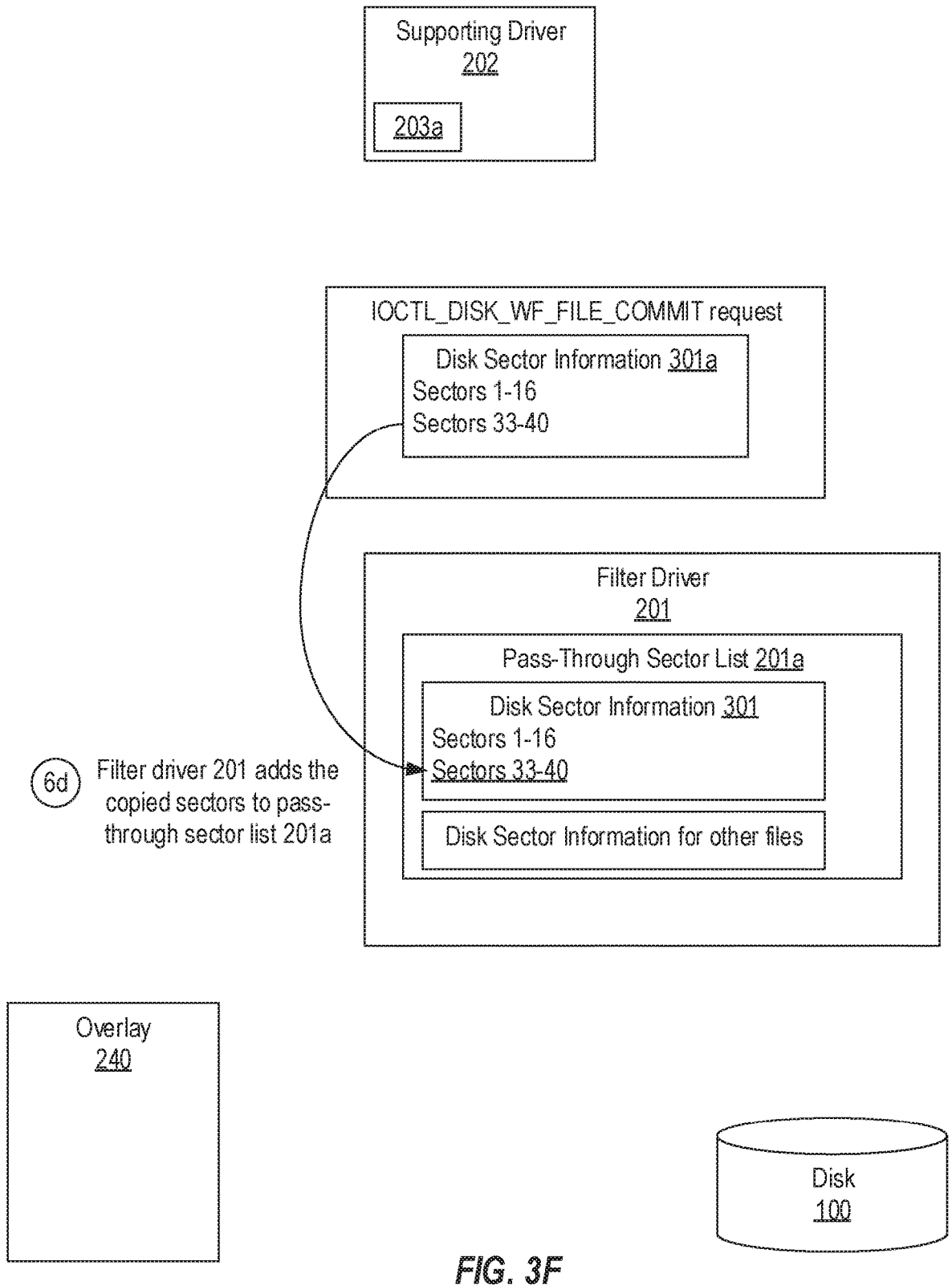
Figure 4:
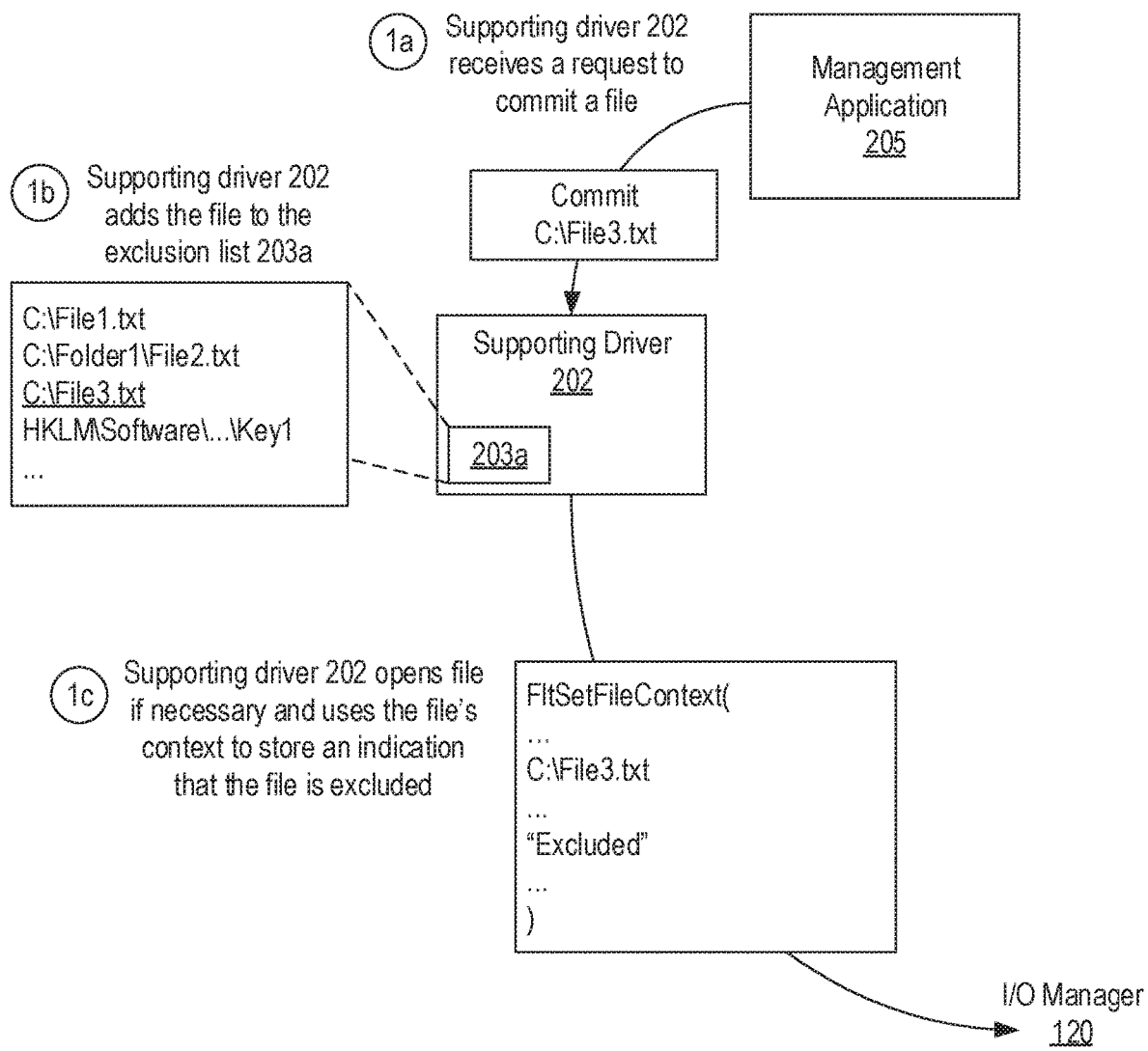

FIGS. 3A-3F depict a sequence of steps that represent how write filter 200 provides file exclusion functionality. FIG. 4 in conjunction with FIGS. 3D-3F depict a sequence of steps that represent how write filter 200 provides file commit functionality. As a general overview, supporting driver 202 can identify the disk sector information for an excluded file and provide the disk sector information to filter driver 201. Filter driver 201 can then use this disk sector information to determine whether to redirect I/O requests to overlay 240 or to direct the I/O requests to disk 100.

Turning to FIG. 3A, it is assumed that filter driver 201 and supporting driver 202 have been loaded in the I/O stack for a volume and that supporting driver 202 has received exclusion list 203a. To provide an example, exclusion list 203a is shown as including two files—C:\File1.txt and C:\Folder1\File2.txt—and a registry key—\HKLM\Software\ . . . \Key1, among possibly many other exclusions. It is also assumed that supporting driver 202 has registered callback routines for the appropriate types of I/O requests including requests to open/create files (e.g., IRP_MJ_CREATE requests) and requests to clean up a file's context (e.g., IRP_MJ_CLEANUP requests).

In step 1a, it is assumed that supporting driver 202 receives an I/O request to open the file C: \File1.txt. For example, I/O manager 120 could pass an IRP_MJ_CREATE request to supporting driver 202 by calling supporting driver 202's callback routine that was registered for such requests. In response to receiving this request to open the file, in step 1b, supporting driver 202 can determine whether the file that is the target of the open request is in the exclusion list. In other words, supporting driver 202 can determine whether the I/O request is attempting to open a file that should be excluded from the write filter protection that filter driver 201 provides.

If the targeted file is not in the exclusion list, supporting driver 202 could simply complete the I/O request. However, in this example, supporting driver 202 will determine that the targeted file, C:\File1.txt, is included in exclusion list 203a. Therefore, in step 1c, supporting driver 202 can request the disk sector information for C:\File1.txt—the file that is being opened. In some embodiments, supporting driver 202 could obtain the disk sector information for the targeted file by sending a FSCTL_GET_RETRIEVAL_POINTERS I/O request to file system driver 111 (e.g., using the FltFsControlFile function). In step 1d, supporting driver 202 receives the disk sector information for C:\File1.txt—disk sector information 301.

In some embodiments, this disk sector information could be in the form of one or more extents that are defined in a RETRIEVAL_POINTERS_BUFFER. In the Windows operating system, an extent is a run of contiguous clusters where a cluster consists of one or more contiguous sectors. A sector is the smallest physical storage unit on a disk and is typically 512 bytes in size. In the RETRIEVAL_POINTERS_BUFFER, each extent is defined by a logical cluster number representing where the extent begins on the volume (i.e., the beginning segment in the extent) and two virtual cluster numbers that identify the length in clusters of the extent. Because a file may be fragmented on disk 100, multiple extents may define where the file is stored. Using these extents, it can be determined which segments of disk 100 contain the file's content. In other words, a cluster number can be viewed as an identifier of the underlying physical segment(s) that the cluster encompasses.

Turning to FIG. 3B, in step 2a, which supporting driver 202 could perform after step 1b but not necessarily after steps 1c and 1d as part of its handling of the request to open the file, supporting driver 202 can use the context of the file being opened to store an indication that the file is excluded from write filter protection. For example, as part of its initialization, supporting driver 202 can register a context type of FLT_FILE_CONTEXT. Then, as part of step 2a, supporting driver 202 can create a context of this registered context type (e.g., by calling FltAllocateContext)) and then attach the context to the file object of the file being opened (e.g. by calling FltSetFileContext). The content of the context could be any information that could indicate to supporting driver 202 that a file is excluded from write filter protection. For example, the context structure could include the string "Excluded" or could even include the disk sector information that is received in step 2d. In some embodiments, the existence of a context alone could be sufficient to identify a file as excluded. In any case, by setting the context of the file being opened, the context will be attached to the file's file object while it remains open.

In step 2b, which supporting driver 202 can also perform as part of its handling of the request to open the file, supporting driver 202 sends an exclusion request that provides disk sector information 301 to filter driver 201. For example, supporting driver 202 and filter driver 201 could be configured to employ a custom I/O control code such as IOCTL_DISK_WF_FILE_EXCLUSION for communicating disk sector information for an excluded file when the file is being opened. In response to receiving disk sector information 301, in step 3, filter driver 201 can store disk sector information 301 in a pass-through sector list 201a. As described above, in some embodiments, pass-through sector list 201a could contain a listing of logical cluster numbers. However, disk sector information 301 and/or pass-through sector list 201a could maintain any suitable type of information that identifies—or could be used to identify—sectors to which write filter protection should not apply. Accordingly, the term "pass-through" represents that I/O requests that target sectors identified in pass-through sector list 201a will be passed-through to disk 100 rather than being redirected to overlay 240.

To summarize, when supporting driver 202 receives an I/O request for opening/creating a file (e.g., when it receives an IRP_MJ_CREATE request via its preoperation callback routine that is registered for such IRPs) and determines that the targeted file is identified in exclusion list 203a (or otherwise identified as a file that should be excluded from write filter protection), supporting driver 202 can (1) obtain disk sector information for the file and provide it to filter driver 201 to cause filter driver 201 to exclude the sectors identified by the disk sector information from write filter protection and (2) tag the file as being excluded (e.g., by attaching context to the file's file object).

FIG. 3C represents how filter driver 201 can perform write filter protection. In this figure, it is assumed that filter driver 201 has updated list 201a to include disk sector information 301 (or to otherwise include the sectors that are identified by disk sector information 301) and is therefore configured to exclude from write filter protection the sectors in which the content of C:\File1.txt is stored at the time the file is opened. It is then assumed that, in step 4a, filter driver 201 receives one or more I/O requests that identify sectors to be written. For example, filter driver 201 could receive an IRP_MJ_WRITE request that includes the content to be written and specifies logical/virtual cluster numbers to define which sectors on disk 100 the content should be written to. In response to receiving the write request, in step 4b, filter driver 201 can compare the sectors that are to be written to pass-through sector list 201a (i.e., filter driver 201 can determine whether any sector is a "pass-through sector"). As represented by step 4c, for any sectors that are included in pass-through list 201a, filter driver 201 can send the I/O request (or a modified or separate I/O request) down the I/O stack so that the content is written to the sectors on disk 100. In contrast, as represented in step 4d, for any sectors that are not included in pass-through list 201a, filter driver 201 can redirect the I/O request (or a modified or separate I/O request) to overlay 240 so that the content is stored in overlay 240. In short, filter driver 201 ensures that sectors that are not included in pass-through sector list 201a will not be modified.

It is noted that filter driver 201 can perform similar processing on an I/O request that reads the content of sectors. In particular, filter driver 201 can maintain metadata that defines sectors that have been stored in overlay 240. When a read request is received, filter driver 201 can determine whether any sector to be read has been stored in overlay 240 (which would be the case if the sector is not a pass-through sector and was previously modified). If so, filter driver 201 will cause the read of that sector to be serviced from overlay 240 rather than from disk 100 (i.e., the modified content of the sector is read from overlay 240 rather than reading the unmodified content of the sector from disk 100). Otherwise, filter driver 201a will cause the read to be serviced from disk 100.

Returning to the handling of write requests, if filter driver 201 receives a write request that only identifies sectors that are also identified in pass-through sector list 201a, filter driver 201 would simply pass the write request down the I/O stack resulting in those sectors being modified on disk 100. Using the C:\File1.txt example, this may be the case if the application that opens C:\File1.txt makes a minimal change to the file that does not require the size of the file to grow beyond the segments that it currently occupies. However, if C:\File1.txt is modified in a way that would require additional sectors, the write request may identify sectors that are not included in pass-through sector list 201a (and may also identify sectors that are included in pass-through sector list 201a) even though the content to be written to such sectors pertains to C:\File1.txt. For example, if the application that opened C:\File1.txt appended content to the file's existing content, the file system may have allocated additional clusters to contain the appended content and therefore the write request would identify these additional clusters. In this scenario, pass-through sector list 201a will no longer identify each segment that contains the content of C:\File1.txt. Stated another way, filter driver 201 will have caused some of the content of C:\File1.txt—the content of segments that are not identified in pass-through segment list 201a—to be stored in overlay 240.

FIGS. 3D-3F illustrate how supporting driver 202 ensures that any segments of an excluded file that are initially stored in overlay 240 will be moved to disk 100. These figures will also be based on the C:\File1.txt example. In step 5a, supporting driver 202 receives an I/O request for cleaning up a file's context. For example, I/O manager 120 may pass an IRP_MJ_CLEANUP request to supporting driver 202 after the application that opened file C:\File1.txt has closed it. More particularly, when the application sends a request to close the file, the handle reference count on the file object for C:\File1.txt may be decremented to zero which triggers the context cleanup process. As part of its callback routine for such context cleanup requests, in step 5b, supporting driver 202 can retrieve the file context that was attached to the file that is being closed. In this example, supporting driver 202 will receive the context that it attached to C:\File1.txt's file object in step 2a. In contrast, when handling IRP_MJ_CLEANUP requests for other files, supporting driver 202 may receive no context at all (e.g., if it did not set context for the file when it was opened) or may receive context that indicates that the file is not excluded (e.g., if it stores context for any file being opened regardless of whether the file is excluded). In any case, as part of requesting the file context during the context cleanup handling, supporting driver 202 can determine whether the context indicates that the file is excluded from write filter protection.

Since the file object for C:\File1.txt will include context that indicates that the file is excluded, in step 5c, supporting driver 202 can send another request to retrieve the disk sector information for the file. As represented, this request can be similar to the request supporting driver 202 sent in step 1c. In step 5d, supporting driver 202 will receive back the current disk sector information 301a. If the file that was opened was not modified or was modified in a way that did not cause its content to expand beyond its allocated sectors, this current disk sector information 301a should match the disk sector information 301 that was received in step 1d. In this example, however, it is assumed that C:\File1.txt was modified in a way that caused its content to expand to additional sectors and that the content of these additional sectors is now stored in overlay 240. Therefore, the current disk sector information 301a that file system driver 111 reports for C: \File1.txt will identify sectors that were not identified in disk sector information 301 and are therefore not included in pass-through sector list 201a.

Turning to FIG. 3E, in step 6a, supporting driver 202 can send a commit request that provides the current disk sector information 301a to filter driver 201. For example, supporting driver 202 and filter driver 201 could be configured to employ a custom I/O control code such as IOCTL_DISK_WF_FILE_COMMIT for communicating disk sector information for an excluded file when it is being closed. For illustrative purposes, the current disk sector information 301a is shown as identifying sectors 1-16 and sectors 33-40 while the original disk sector information 301 that is stored in pass-through sector list 201a only identifies sectors 1-16 (which could represent a scenario where C:\File1.txt was originally allocated to two 4 KB clusters encompassing sectors 1-16 and the modifications to the file caused a 4 KB cluster encompassing sectors 33-40 to be allocated to contain the file).

In response to receiving the commit request, in step 6b, filter driver 201 can compare the current disk sector information 301a to pass-through sector list 201a to determine which, if any, sectors identified in current disk sector information 301a are not included in pass-through sector list 201a. In this example, filter driver 201 will determine that sectors 33-40 are not included in pass-through sector list 201a.

In step 6c, filter driver 201 can copy any sectors (i.e., the content of any sectors) that are identified in current disk sector information 301a but not included in pass-through sector list 201a from overlay 240 to disk 100. In this example, filter driver 201 will cause the content of C:\File1.txt that is allocated to sectors 33-40 which was previously stored in overlay 240 to be written to sectors 33-40 on disk 100. Although not shown, when filter driver 201 stored this content of sectors 33-40 in overlay 240 (in step 4d), it could have defined a mapping between this content and sectors 33-40. This mapping would enable filter driver 201 to locate the correct content to be copied from overlay 240 to disk 100.

Finally, in step 6d shown in FIG. 3F, filter driver 201 can add any sector that was copied from overlay 240 to disk 100 to pass-through sector list 201a (i.e., filter driver 201 can make pass-through sector list 201a consistent with disk sector information 301a). This will ensure that subsequent I/O requests that target these sectors—e.g., subsequent I/O requests that target these portions of C:\File1.txt—will be directed to disk 100.

To summarize, when supporting driver 202 is notified that a file is being closed, it can determine whether the file is excluded such as by retrieving a context associated with the file's file object. If the file being closed is an excluded file, supporting driver 202 can retrieve the file's disk sector information from the file system. Supporting driver 202 can then send a commit request to filter driver 201 and provide the file's disk sector information. Filter driver 201 uses the disk sector information received in this commit request to locate any content of the file being closed that may have been stored in overlay 240 and persists it to corresponding sectors on disk 100. Filter driver 201 also adds these sectors to pass-through sector list 201a. Accordingly, this processing ensures that all content of the excluded file, including content pertaining to sectors that were newly allocated to contain the file, will be persisted to disk 100. As can be seen, even though write filter 200 provides write filter protection at the sector level, it still enables specific files to be excluded from protection.

A similar process can be performed to enable a modified filed stored in overlay 240 to be committed to disk 100. FIG. 4 illustrates how such file commits can be initiated. In step 1a, supporting driver 202 receives a request to commit a specific file. In typical scenarios, an administrator could employ management application 203 to specify the file to be committed, but this request could be generated in other manners. As an example, an administrator could modify a non-excluded file (or registry key) as part of installing an update or changing a configuration setting on the client device. Because the modified file is not excluded from write protection, the modified content will be stored in overlay 240 with the original content of the file on disk 100 remaining unchanged.

In response to receiving the request to commit the file, supporting driver 202 can update exclusion list 203a to include the file to be committed (unless it is already an excluded file). Additionally, supporting driver 202 can open the file if not already open and set its file context to reflect that it is an excluded file. If the file was not already open, supporting driver 202 can then close the file, which will immediately trigger the context cleanup process depicted in FIG. 3D. Otherwise, the context cleanup process will be carried out once the file is closed by whatever process/application had previously opened it. Accordingly, the commit process can follow steps 1a-1c of FIG. 4 and then steps 5a-5d and 6a-6d in FIGS. 3D-3F. Also, because supporting driver 202 adds the committed file to exclusion list 202a, when the committed file is subsequently opened, it will be handled as an excluded file.

Although not shown in the figures, write filter 200 can also be configured to handle trim commands so that it can discard deleted files from overlay 240. For example, filter driver 201 can register to receive IRP_MJ_DEVICE_CONTROL requests so that it can detect when an IOCTL_STORAGE_MANAGE_DATA_SET_ATTRIBUTES control code is sent to volume manager 112. When it receives this type of control code, filter driver 201 can inspect it to determine whether it specifies a trim command. A trim command (e.g., TRIM in the ATA command set and UNMAP in the SCSI command set) is used to inform a solid-state drive (SSD) that certain blocks of data are no longer being used. For example, the file system could send a trim command when a file is deleted or when a file's size is reduced to notify the SSD of the extents that are no longer in use. When write filter 200 detects a trim command, it can determine which sectors (e.g., using the LCNs defined in the trim command) are cached in overlay 240 and can discard them. Without this functionality, these sectors may remain in overlay 240 indefinitely thereby consuming the overlay unnecessarily.

Figure 5A:
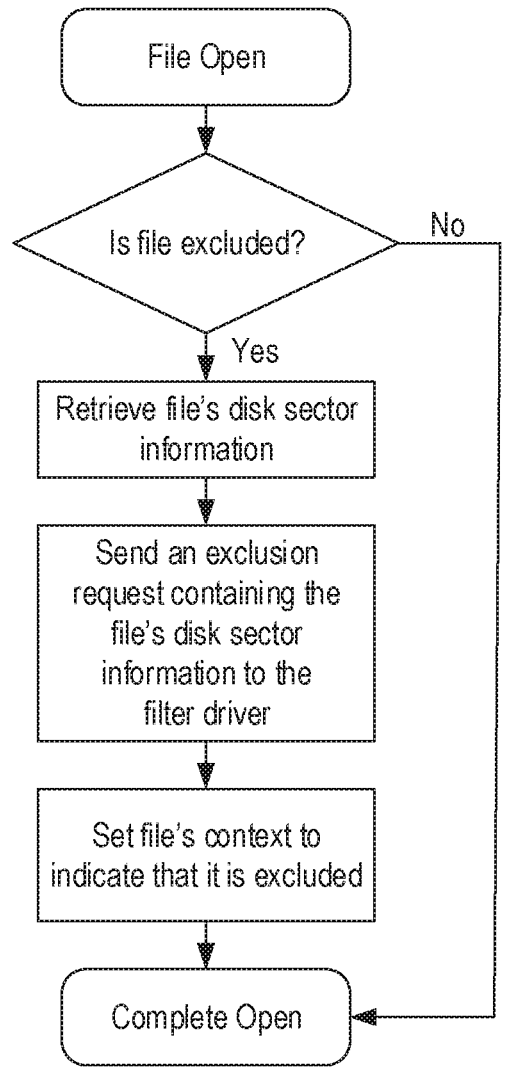
FIGS. 5A-5C provide flow diagrams of example processes that a supporting driver of the write filter can perform.
Figure 5B:
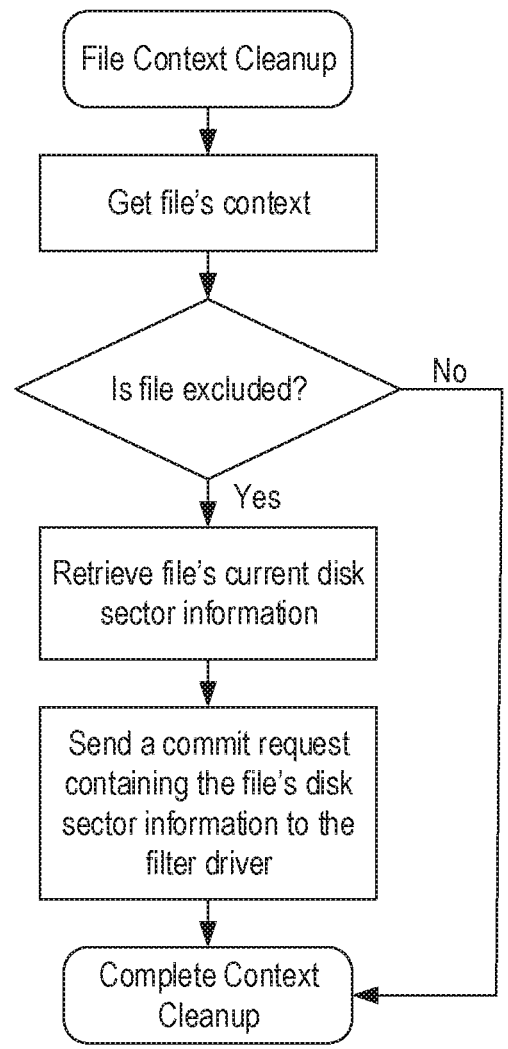
Figure 5C:
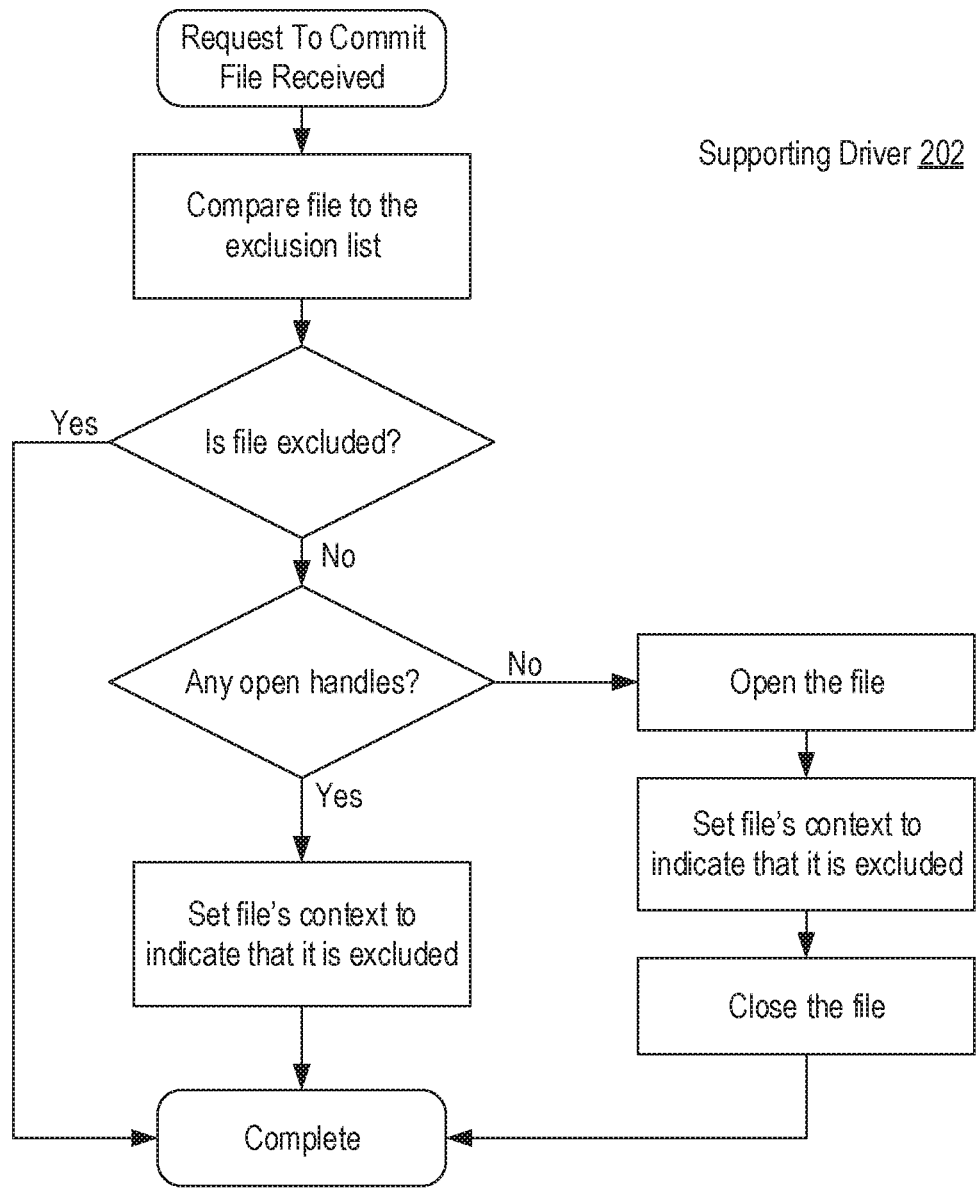
Figure 6A:
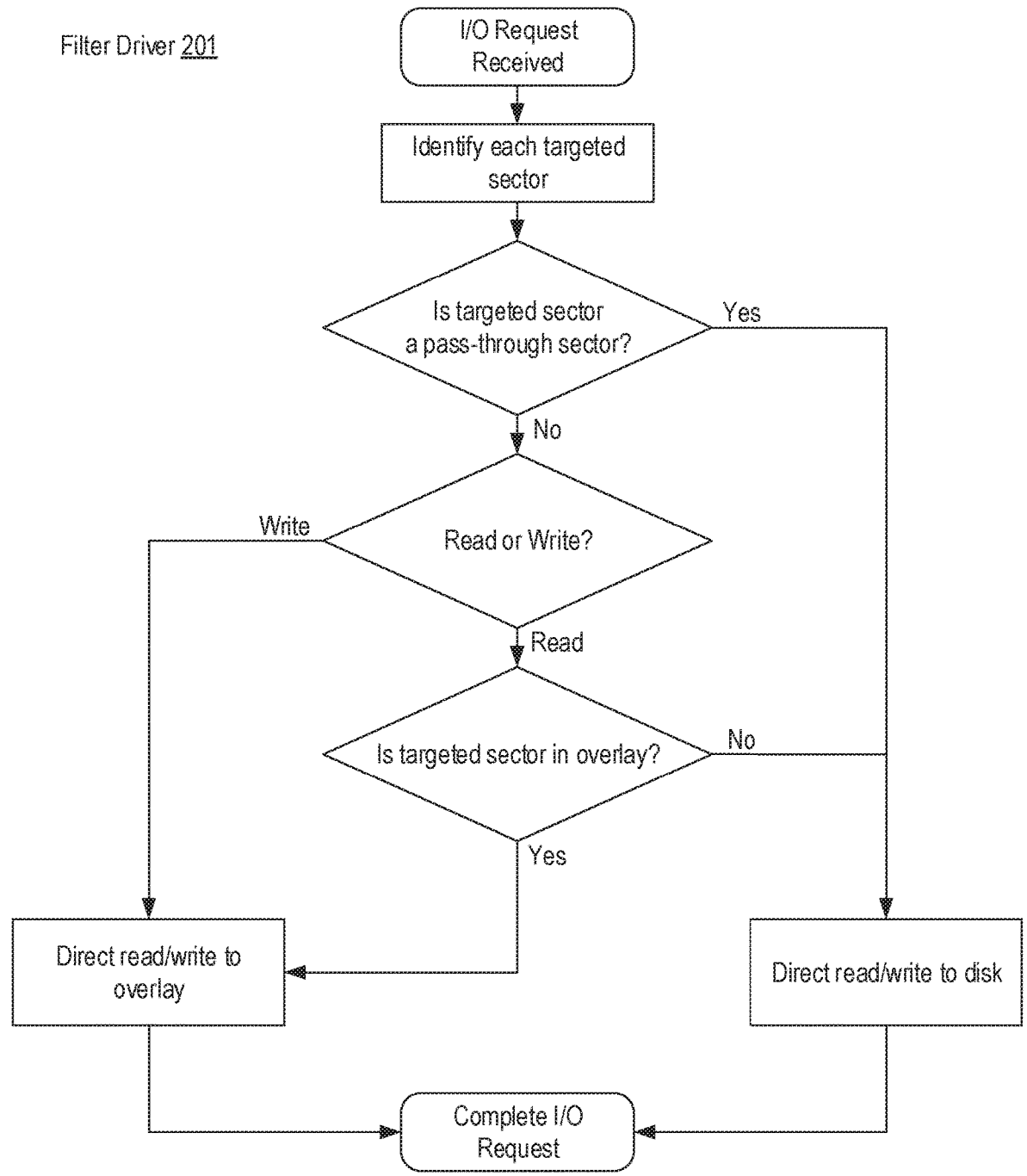
FIGS. 6A and 6B provide flow diagrams of example processes that a filter driver of the write filter can perform.
Figure 6B:
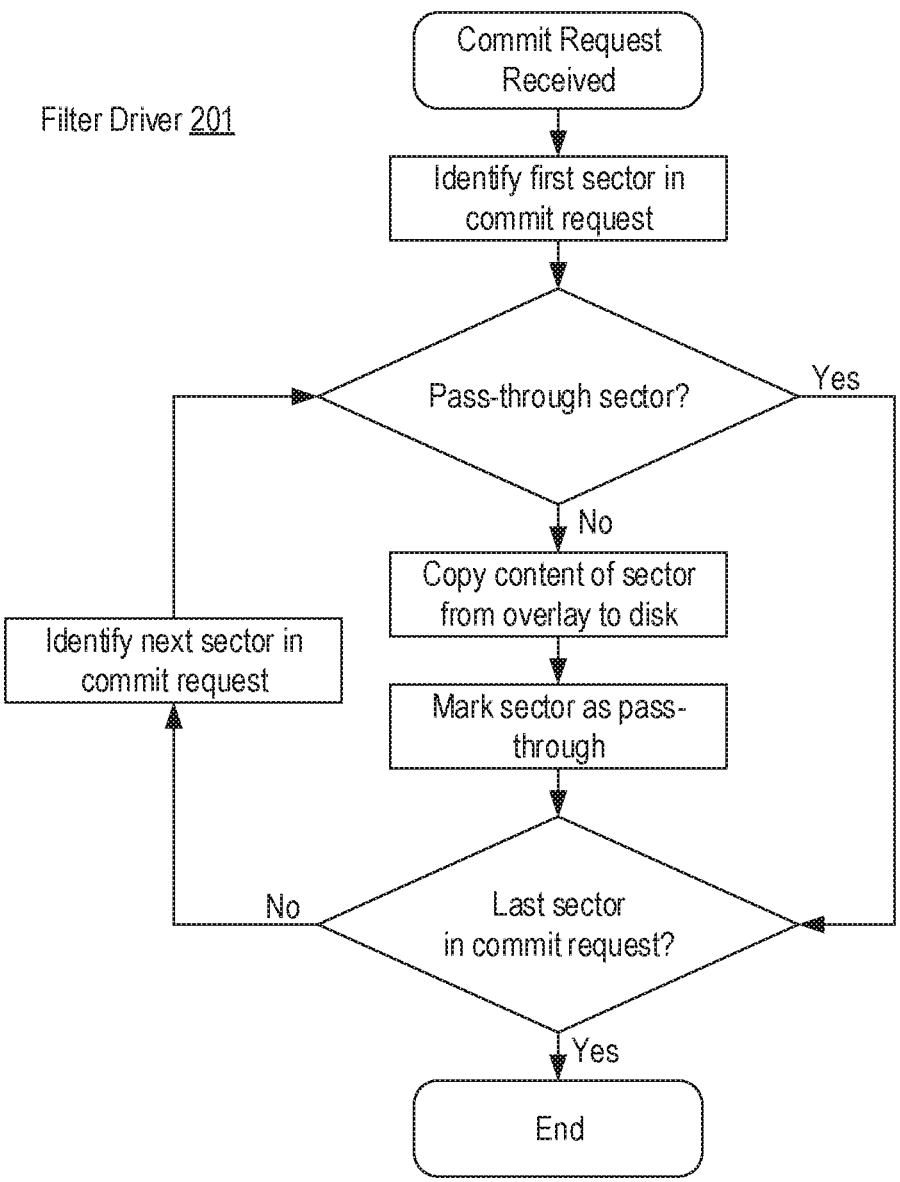

FIGS. 5A-5C provide flow diagrams representing the functionality that supporting driver 202 can perform, while FIGS. 6A and 6B provide flow diagrams representing the functionality that filter driver 201 can perform. These flow diagrams generally correspond with the steps shown in FIGS. 3A-3F and 4 but are intended to provide a more general description of the functionality that may be performed to support file exclusions and commits in a disk-based write filter.

FIG. 5A represents functionality that supporting driver 202 performs when a file is being opened. Initially, supporting driver 202 can identify the file that is being opened and determine whether it is excluded from write filter protection. If not, supporting driver 202 can complete the open. In contrast, if the file is excluded, supporting driver 202 can retrieve the file's disk sector information, send the file's disk sector information to filter driver 201 as part of an exclusion request and set the file's context to indicate that it is excluded.

FIG. 5B represents functionality that supporting driver 202 performs when a file is being closed. Supporting driver 202 is initially notified that the file's context is being cleaned up prior to closing the file. In response, supporting driver 202 can retrieve any file context that supporting driver 202 may have set for the file. From the file context, supporting driver 202 can determine whether the file is excluded from write filter protection. If not, supporting driver 202 can complete its context cleanup handling. If so, however, supporting driver 202 can retrieve the file's disk sector information and send the file's disk sector information to filter driver 201 as part of a commit request.

FIG. 5C represents functionality that supporting driver 202 performs when it receives a request to commit a file. After identifying the file to be committed, including normalizing the filename if necessary, supporting driver 202 compares the file to be committed to the exclusion list to determine whether the file to be committed is an excluded file. If the file to be committed is an excluded file, supporting driver 202 can complete the request since write filter 200 should already be persisting the content of the file to disk. In contrast, if the file to be committed is not an excluded file, supporting driver 202 can determine whether there are any open handles to the file. If not, supporting driver 202 can open the file, set the file's context to indicate that it is excluded and then close the file to complete its processing of the request to commit the file. If there are open handles to the file, supporting driver 202 can set the file's context to indicate that it is excluded and complete its processing of the request to commit the file.

FIG. 6A represents functionality that filter driver 201 performs when it receives an I/O request (e.g., read or write requests). Filter driver 201 can initially identify which sectors the I/O request targets. For each targeted sector, filter driver 201 can determine whether the sector is a pass-through sector and, if so, direct the I/O request to the disk. If the targeted sector is not a pass-through sector, filter driver 201 can determine whether the I/O request is a read or a write. If the I/O request is a write, filter driver 201 directs the write to the overlay (e.g., reparses the write to the overlay). If the I/O request is a read, filter driver 201 determines whether the targeted sector is cached in the overlay. If so, the read is directed/reparsed to the overlay. If not, the read is directed to the disk. Although not shown, filter driver 201 can handle a single I/O request by splitting it into two requests where one is directed to disk and the other is directed to the overlay. This may be necessary for a read request when only some of the file's content is stored in the overlay and may be necessary for a write request when only some of the targeted sectors are pass-through sectors.

FIG. 6B represents functionality that filter driver 201 performs when it receives a commit request from supporting driver 202. Initially, filter driver 201 can identify the first sector that is included in the commit request. Filter driver 201 can then determine if the sector is a pass-through sector. If so, filter driver 201 can move to the next sector that is included in the commit request. If not, filter driver 201 can copy the content of the sector from the overlay to the disk, mark the sector as pass-through and move to the next sector that is included in the commit request. Filter driver 201 can perform this processing on each sector included in the commit request.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented by a disk-based write filter that provides write filter protection to a volume, for supporting file exclusions, the method comprising:
   receiving, at a supporting driver of the disk-based write filter, an I/O request for opening a file;
   determining, by the supporting driver, that the file should be excluded from the write filter protection;
   in response to the determination, retrieving, by the supporting driver, disk sector information for the file;

sending, by the supporting driver, the disk sector information to a filter driver of the disk-based write filter; and employing, by the filter driver, the disk sector information to exclude the file from the write filter protection.

2. The method of claim 1, wherein:

the supporting driver is a file system filter driver; or the supporting driver is a registry filter driver such that the file is a registry entry.

3. The method of claim 1, wherein the disk sector information comprises one or more cluster numbers that represent sectors of a disk that have been allocated to store the file.

4. The method of claim 1, wherein sending the disk sector information to the filter driver comprises sending a separate I/O request to the filter driver.

5. The method of claim 1, wherein employing the disk sector information to exclude the file from the write filter protection comprises directing I/O requests that target any sector defined in the disk sector information to disk rather than redirecting the I/O requests to an overlay.

6. The method of claim 1, further comprising:

as part of handling the I/O request for opening the file, setting, by the supporting driver, a context of the file to indicate that the file is excluded.

7. The method of claim 6, further comprising:

receiving, at the supporting driver, an I/O request for closing the file;

retrieving, by the supporting driver, the context of the file;

in response to determining that the context of the file indicates that the file is excluded, retrieving, by the supporting driver, current disk sector information for the file; and sending, by the supporting driver, the current disk sector information to the filter driver.

8. The method of claim 7, further comprising:

determining, by the filter driver, that the current disk sector information identifies one or more sectors that were not identified in the disk sector information; and causing, by the filter driver, content pertaining to the one or more sectors to be copied from an overlay to the one or more sectors.

9. The method of claim 8, further comprising:

employing, by the filter driver, the current disk sector information to exclude the file from the write filter protection.

10. The method of claim 1, further comprising:

receiving, by the filter driver, a trim command;

determining, by the filter driver, that the trim command pertains to content stored in an overlay; and causing, by the filter driver, the content to which the trim command pertains to be discarded from the overlay.

11. The method of claim 1, further comprising:

receiving, at the supporting driver, a request to commit a second file that is not excluded from the write filter protection;

setting, by the supporting driver, a context of the second file to indicate that the second file is excluded;

receiving, at the supporting driver, an I/O request for closing the second file;

retrieving, by the supporting driver, the context of the second file;

in response to determining that the context of the second file indicates that the second file is excluded, retrieving, by the supporting driver, disk sector information for the second file;

sending, by the supporting driver, the disk sector information for the second file to the filter driver;

determining, by the filter driver, that the disk sector information for the second file identifies content stored in an overlay; and causing, by the filter driver, the content to be copied from the overlay to disk.

12. The method of claim 11, further comprising:

employing, by the filter driver, the disk sector information of the second file to exclude the second file from the write filter protection.

13. One or more computer storage media storing computer executable instructions which when executed on a client device implement a disk-based write filter that provides write filter protection to a volume while also supporting file exclusions by performing the following method:

receiving, at a supporting driver of the disk-based write filter that is loaded above a file system driver for the volume, an I/O request for opening a file;

determining, by the supporting driver, that the file should be excluded from the write filter protection;

in response to the determination, retrieving, by the supporting driver, disk sector information for the file;

sending, by the supporting driver, the disk sector information to a filter driver of the disk-based write filter that is loaded below the file system driver; and employing, by the filter driver, the disk sector information to exclude the file from the write filter protection.

14. The computer storage media of claim 13, wherein the method further comprises:

as part of handling the I/O request for opening the file, setting, by the supporting driver, a context of the file to indicate that the file is excluded;

receiving, at the supporting driver, an I/O request for closing the file;

retrieving, by the supporting driver, the context of the file;

in response to determining that the context of the file indicates that the file is excluded, retrieving, by the supporting driver, current disk sector information for the file; and sending, by the supporting driver, the current disk sector information to the filter driver.

15. The computer storage media of claim 14, wherein the method further comprises:

determining, by the filter driver, that the current disk sector information identifies one or more sectors that were not identified in the disk sector information;

causing, by the filter driver, content pertaining to the one or more sectors to be copied from an overlay to the one or more sectors; and employing, by the filter driver, the current disk sector information to exclude the file from the write filter protection.

16. The computer storage media of claim 13, wherein the method further comprises:

receiving, at the supporting driver, a request to commit a second file that is not excluded from the write filter protection;

setting, by the supporting driver, a context of the second file to indicate that the second file is excluded;

receiving, at the supporting driver, an I/O request for closing the second file;

retrieving, by the supporting driver, the context of the second file;

in response to determining that the context of the second file indicates that the second file is excluded, retrieving, by the supporting driver, disk sector information for the second file;

sending, by the supporting driver, the disk sector information for the second file to the filter driver;

determining, by the filter driver, that the disk sector information for the second file identifies content stored in an overlay; and causing, by the filter driver, the content to be copied from the overlay to disk.

17. A method, implemented by a disk-based write filter that provides write filter protection to a volume, for supporting file exclusions, the method comprising:

receiving, at a supporting driver of the disk-based write filter, an IRP_MJ_CREATE request for a file;

as part of handling the IRP_MJ_CREATE request for the file:

determining, by the supporting driver, that the file should be excluded from the write filter protection;

in response to the determination, retrieving, by the supporting driver, disk sector information for the file;

sending, by the supporting driver, the disk sector information to a filter driver of the disk-based write filter to cause the filter driver to employ the disk sector information to exclude the file from the write filter protection; and setting, by the supporting driver, a context of the file to indicate that the file is excluded.

18. The method of claim 17, further comprising:

receiving, at the supporting driver, an IRP_MJ_CLEANUP request for the file;

as part of handling the IRP_MJ_CLEANUP request for the file:

retrieving, by the supporting driver, the context of the file;

determining, by the supporting driver, that the context of the file indicates that the file is excluded;

in response to the determination, retrieving, by the supporting driver, current disk sector information for the file; and sending, by the supporting driver, the current disk sector information to the filter driver to cause the filter driver to employ the current disk sector information to exclude the file from the write filter protection.

19. The method of claim 18, wherein the filter driver employs the current disk sector information to exclude the file from the write filter protection by:

determining that the current disk sector information identifies one or more sectors that were not identified in the disk sector information; and causing content pertaining to the one or more sectors to be copied from an overlay to the one or more sectors.

20. The method of claim 19, wherein determining that the current disk sector information identifies one or more sectors that were not identified in the disk sector information comprises comparing the current disk sector information to a pass-through sector list.

* * * * *